(12) United States Patent
Dold

(10) Patent No.: US 10,905,907 B1
(45) Date of Patent: Feb. 2, 2021

(54) SYSTEM AND METHOD FOR LEVERAGE-ASSISTED TOOL AND HARNESS

(71) Applicant: Alexander Dold, Evanston, IL (US)

(72) Inventor: Alexander Dold, Evanston, IL (US)

( * ) Notice: Subject to any disclaimer, the term of this patent is extended or adjusted under 35 U.S.C. 154(b) by 149 days.

(21) Appl. No.: 15/811,938

(22) Filed: Nov. 14, 2017

Related U.S. Application Data

(60) Provisional application No. 62/421,476, filed on Nov. 14, 2016.

(51) Int. Cl.
*A62B 35/00* (2006.01)
*E01H 5/02* (2006.01)
*A01B 1/02* (2006.01)
*B25G 1/10* (2006.01)

(52) U.S. Cl.
CPC .......... *A62B 35/0025* (2013.01); *A01B 1/022* (2013.01); *B25G 1/102* (2013.01); *E01H 5/02* (2013.01)

(58) Field of Classification Search
CPC .... A62B 35/0025; A01B 1/022; B25G 1/102; E01H 5/02
USPC ....................................................... 224/268
See application file for complete search history.

(56) References Cited

U.S. PATENT DOCUMENTS

| | | |
|---|---|---|
| 62,594 A | 3/1867 | Beale |
| 635,591 A | 10/1899 | Rasmussen |
| 845,592 A | 2/1907 | Stewart |
| 2,092,279 A | 9/1937 | Jeffers |
| 2,651,441 A | 9/1953 | Rau et al. |
| 3,078,604 A * | 2/1963 | Neuman .................... E01H 5/02 294/54.5 |
| 3,090,984 A | 5/1963 | Dunnigan |
| 3,136,574 A | 6/1964 | Pasquale |
| 3,781,991 A * | 1/1974 | Stretton ................. A01D 34/73 30/276 |
| 3,964,182 A | 6/1976 | Pomeret et al. |
| 4,198,090 A | 4/1980 | Gutman |
| 4,477,972 A | 10/1984 | Testa |
| 4,650,232 A * | 3/1987 | Perry ..................... B66F 19/005 254/131 |
| 4,690,447 A * | 9/1987 | Adams ..................... A01B 1/22 294/57 |
| 4,772,057 A * | 9/1988 | Harvey .................. A01B 1/026 224/250 |
| 4,958,407 A * | 9/1990 | Johnson ................... A01B 1/22 15/144.1 |
| 5,120,098 A * | 6/1992 | Childress ............... A01B 1/028 254/131.5 |
| 5,165,144 A * | 11/1992 | Nisenbaum .............. B25G 1/00 15/145 |
| 5,188,340 A * | 2/1993 | Green ..................... A01B 1/16 172/21 |

(Continued)

*Primary Examiner* — Peter N Helvey
(74) *Attorney, Agent, or Firm* — DLA Piper LLP (US)

(57) ABSTRACT

A tool is disclosed that may have a tool head and an elongated handle attached to the tool head that has a distal end connected to the tool head and a proximal end having a curved portion forming a shape that allows the tool head to be manipulated by a user. The elongated handle has a handle shaft shape that is slightly curved in a middle region. In other embodiments, the tool may further comprise a harness and an attachment mechanism so that the elongated handle of the tool may be manipulated by the user.

18 Claims, 8 Drawing Sheets

(56) References Cited

U.S. PATENT DOCUMENTS

| | | | | |
|---|---|---|---|---|
| 5,323,506 A | * | 6/1994 | Babitch | A47L 13/10 |
| | | | | 15/176.3 |
| 5,620,121 A | * | 4/1997 | Watson | A01D 34/902 |
| | | | | 172/370 |
| 5,687,892 A | * | 11/1997 | Johns | A45F 5/02 |
| | | | | 224/268 |
| 5,791,006 A | * | 8/1998 | Anctil | A46B 17/02 |
| | | | | 15/143.1 |
| 5,794,307 A | * | 8/1998 | Overcash | B62B 1/18 |
| | | | | 16/427 |
| 6,062,449 A | * | 5/2000 | Kahn | A45F 5/02 |
| | | | | 224/268 |
| 6,158,636 A | * | 12/2000 | Latiolais | A45F 3/14 |
| | | | | 224/257 |
| 6,237,975 B1 | * | 5/2001 | Drobot | A01B 1/028 |
| | | | | 254/131.5 |
| 6,336,254 B1 | * | 1/2002 | Graff | B62B 5/06 |
| | | | | 16/422 |
| 6,487,747 B2 | * | 12/2002 | Cavalheiro | A01B 1/00 |
| | | | | 15/143.1 |
| D482,873 S | * | 12/2003 | Greenberg | D4/132 |
| D482,875 S | * | 12/2003 | Greenberg | D4/138 |
| D483,185 S | * | 12/2003 | Greenberg | D4/132 |
| 6,684,459 B2 | * | 2/2004 | Dickhaus | A01B 1/02 |
| | | | | 16/430 |
| D536,178 S | * | 2/2007 | Greenberg | D4/129 |
| D579,165 S | * | 10/2008 | Handy | D32/40 |
| D602,664 S | * | 10/2009 | Crawford | D32/40 |
| 7,617,572 B2 | * | 11/2009 | Hovsepian | B25G 1/04 |
| | | | | 15/143.1 |
| D608,086 S | * | 1/2010 | Johnson | D3/228 |
| D626,388 S | * | 11/2010 | Greenly | D8/10 |
| 8,082,619 B1 | * | 12/2011 | Willey | A46B 5/02 |
| | | | | 15/143.1 |
| 8,166,677 B1 | | 5/2012 | Woyak | |
| 8,375,499 B1 | * | 2/2013 | Marino | B25G 1/102 |
| | | | | 15/143.1 |
| 8,783,534 B1 | * | 7/2014 | Marshall | A45F 5/021 |
| | | | | 224/269 |
| 8,857,682 B2 | * | 10/2014 | Nakaya | A01D 34/902 |
| | | | | 224/257 |
| D718,929 S | * | 12/2014 | Knez | D3/220 |
| 8,925,774 B2 | * | 1/2015 | Mori | A01D 34/902 |
| | | | | 224/259 |
| 9,573,265 B2 | * | 2/2017 | Li | B25G 1/00 |
| 9,662,779 B1 | * | 5/2017 | Yancey | B25G 1/102 |
| 2004/0055099 A1 | * | 3/2004 | Greenberg | B25G 1/102 |
| | | | | 15/143.1 |
| 2006/0265913 A1 | * | 11/2006 | Noonan | E01H 5/02 |
| | | | | 37/285 |
| 2009/0126150 A1 | * | 5/2009 | Tanaya | A47L 13/20 |
| | | | | 16/112.1 |
| 2009/0184527 A1 | * | 7/2009 | Marion | E01H 5/02 |
| | | | | 294/54.5 |

* cited by examiner

SYSTEM AND METHOD FOR LEVERAGE-ASSISTED TOOL AND HARNESS

CROSS REFERENCE TO RELATED APPLICATIONS

This application claims priority under 35 USC 119(e) to U.S. Provisional Patent Application No. 62/421,476 filed 14 Nov. 2016, which is herein incorporated by reference in its entirety.

TECHNICAL FIELD

This application relates to systems and methods that allow a user to stand upright, make use of multiple grip options, and employ a body-mounted fulcrum harness for use with a leverage-assisted tool.

BACKGROUND

Tools that are used while standing upright (known as "standing upright tools") come in different shapes and sizes. One characteristic of a standing upright tool is that the tool has handle made out of various materials with a proximal end and a tool head, such as a shovel, is connected at a distal end of the handle. Conventional standing upright tools have relatively short and straight handles, which requires users to bend forward, putting strain on a user's body, especially the user's lower back. When using these standing upright tools, many injuries occur each year. When using the standing upright tool, a user may have to bend, lift, and twist while handling a weighted load. These hazardous maneuvers cause considerable strain on the user's arms and back and pose a high risk of injury to the user's body.

A leverage-assisted standing upright tool provides a leverage advantage so that it feels like the load is lightened due to the leverage advantage. The leverage-assisted standing upright tool also is more ergonomic than any of the typical standing upright tools. By distributing the weight of the leverage-assisted standing upright tool and the weighted load in a novel way at the center of the user's body and using a fulcrum mounted on a body harness to assist movement, it enables the user to lift the weighted load or perform other tasks easily while standing upright, eliminating hazardous bending and twisting maneuvers which cause strain and injuries to back, arms and shoulders.

SUMMARY

Systems and methods that allows a user to stand upright, make use of multiple grip options, and employ a fulcrum mounted on a body harness to assist with tasks such as loading and unloading a weighted load without bending, twisting, and rotating.

Embodiments include a curved shaft with a "U" shaped elongated handle at the proximal end and a tool head connected to the distal end of the "U" shaped elongated handle.

In some embodiments, the curved shaft rests on the body-mounted fulcrum harness for use as a leverage-assisted tool.

BRIEF DESCRIPTION OF THE DRAWINGS

For a better understanding of the technology described in this document as well as any embodiments thereof, reference should be made to the description below, in conjunction with the following figures in which like reference numerals refer to corresponding parts throughout the figures.

DETAILED DESCRIPTION

Reference will now be made in detail to embodiments, examples of which are illustrated in the accompanying drawings. In the following detailed description, numerous specific details are set forth in order to provide a sufficient understanding of the subject matter present herein. But it will be apparent to one of ordinary skill in the art that the subject matter may be practiced without these specific details. Moreover, the particular embodiments described herein are provided by way of example and should not be used to limit the scope of the invention to these particular embodiments.

Described here are methods and systems for a leverage-assisted tool which uses a fulcrum mounted on a body harness to prevent movements that cause strain and pose a high risk of injury to a user.

Figure 1:
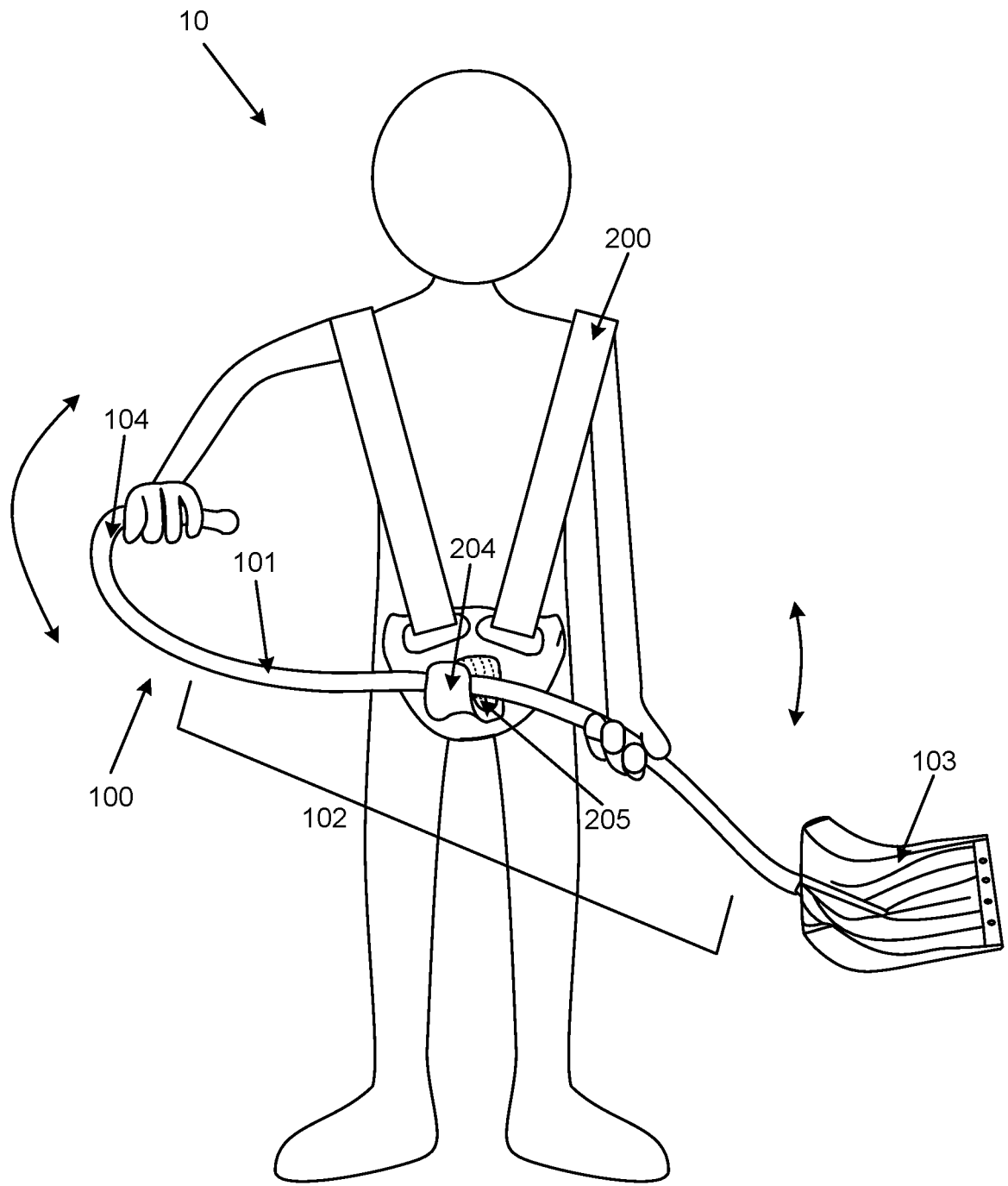
FIG. 1 shows a leverage-assisted tool rested on a body-mounted fulcrum harness in a lifting motion according to the embodiments described herein.

FIG. 1 shows an embodiment of a leverage-assisted tool 10 in which the tool 10 has a leverage-assisted upright tool 100 and an attachment mechanism 200 that releasably connects the leverage-assisted upright tool 100 to a user as shown in FIG. 1. An embodiment of a leverage-assisted standing upright tool 100 is shown in a side view in FIG. 2a. The tool 100 includes a body portion 101 and a tool head 103 connected to an end of the body portion 101. The body portion 101 may be known as a handle of the tool and may further comprise a curved shaft 102 and an end portion 104. The body portion 101 of the tool may thus include the curved shaft 102 and the end portion 104 that may be, for example, an elongated "U" shape at an end proximal to a user. In an exemplar body portion 101 measuring 54 inches overall, the elongated U-shaped handle would be 12 inches long and 10.5 inches wide, and the curved shaft 102 would be 42 inches long with an upward curving portion measuring 28 inches from the distal end of the curved shaft 102 to a center inflection point, and a downward curving portion measuring 14 inches from the center inflection point to the proximal end of the curved shaft 102. The body portion 101 of these measurements is disclosed for illustrative purposes only. The present invention is not to be considered restricted to these or correspondingly proportional dimensions. In some embodiments, the body portion 101 is substantially hollow and substantially cylindrical. The body portion 101 may be composed of metal, plastic, wood, or any number of materials or combination of materials having suitable strength and rigidity for the purpose to which an embodiment of the tool is applied.

Figure 2A:
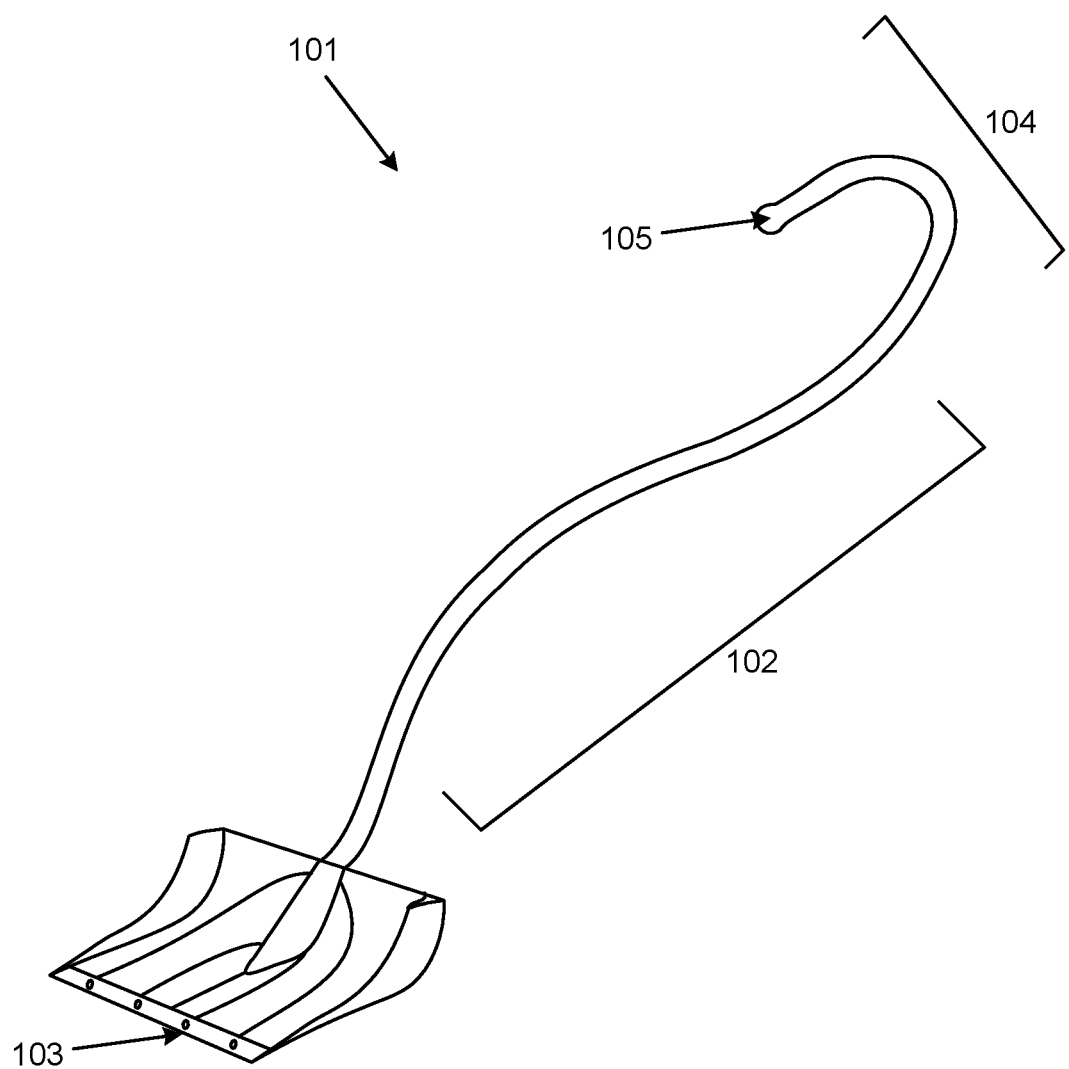
FIG. 2a shows a leverage-assisted tool according to the embodiments described herein.

FIG. 2a shows an embodiment where the tool head 103 is a shovel attached to the body portion 101 at the distal end. In some embodiments, the body 101 and the tool head 103 form a monolithic whole. In some embodiments, an end of the distal end of the body portion 101 is threaded so that the tool head 103 may be screwed onto the body portion 101. In other embodiments, the tool head 103 is attached to the body portion 101 using screws, bolts, rivets, adhesive, or any number of techniques that cause the tool head 103 to remain firmly and largely immovably attached to the body portion 101. In some embodiments, the end portion 104 may have other different shapes that facilitate a user operating the tool as described below. For example, the end portion 104 may form a shape in which an end 105 of the end portion 104 touches or is integrated into a portion of the shaft 102. For example, the end portion 104 may have a circular shape, a loop or other shapes and/or reinforcements. Furthermore, the body portion 101 may have a handle portion located in front of a spot where the tool may rest in the harness that allows the user to grab the tool using the handle portion for the hand closest to the tool head 103.

Figure 2B:
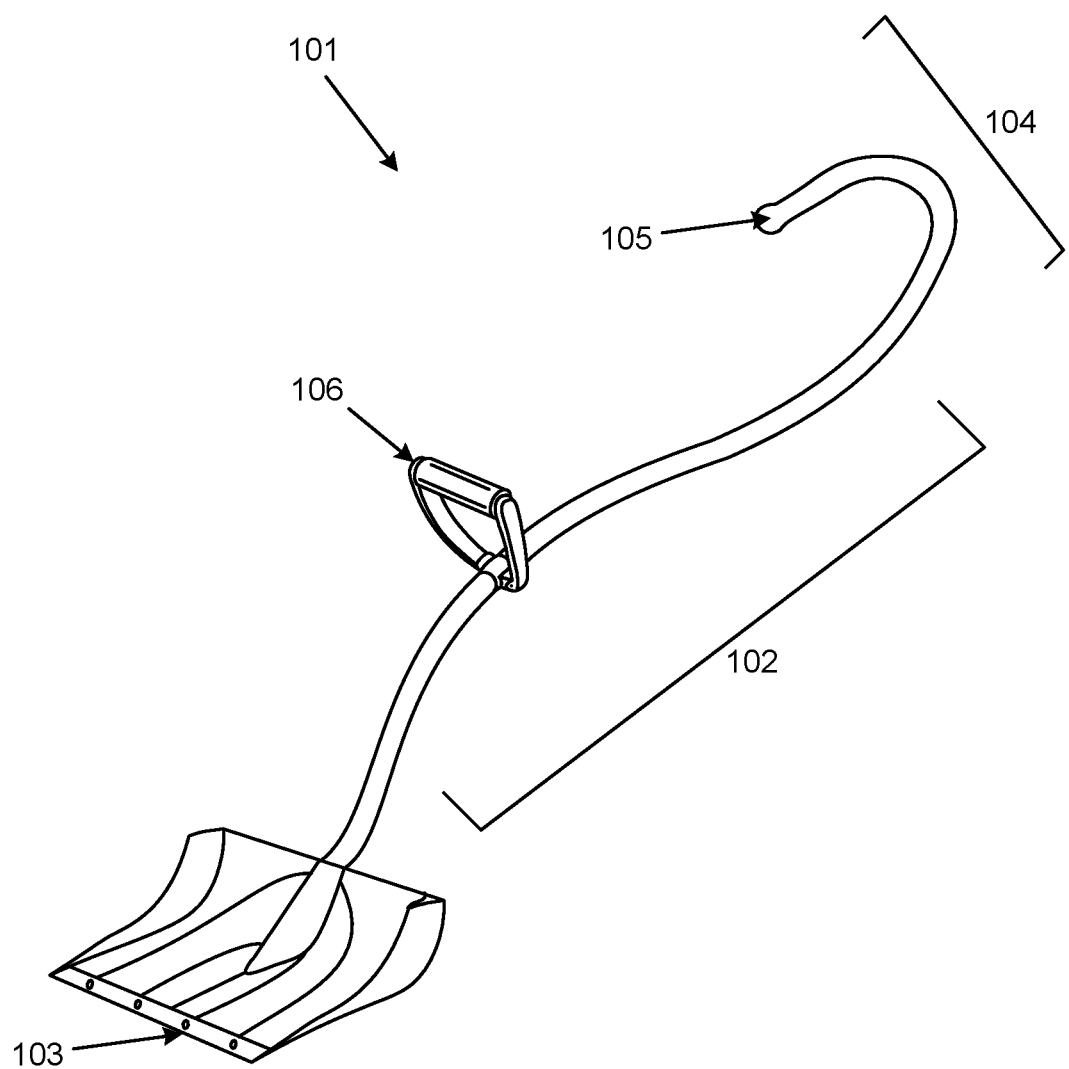
FIG. 2b shows a leverage-assisted tool with a handle according to the embodiments described herein.

FIG. 2b shows an embodiment of a grip handle 106 coupled to the midsection of the body portion 101 and extending at an angle from the body portion 101. The handle may be triangular, circular, or other various shapes. In some embodiments, the grip handle 106 is secured to the body by means of an adjustable ring clamp, allowing the user to position the handle on the body portion 101 to accommodate the user's height and hand grip preference. In other embodiments, the grip handle 106 is attached to the body portion 101 using screws, bolts, rivets, adhesive, or any number of techniques that cause the handle 106 to remain firmly and largely immovably attached to the body portion 101.

Figure 5:
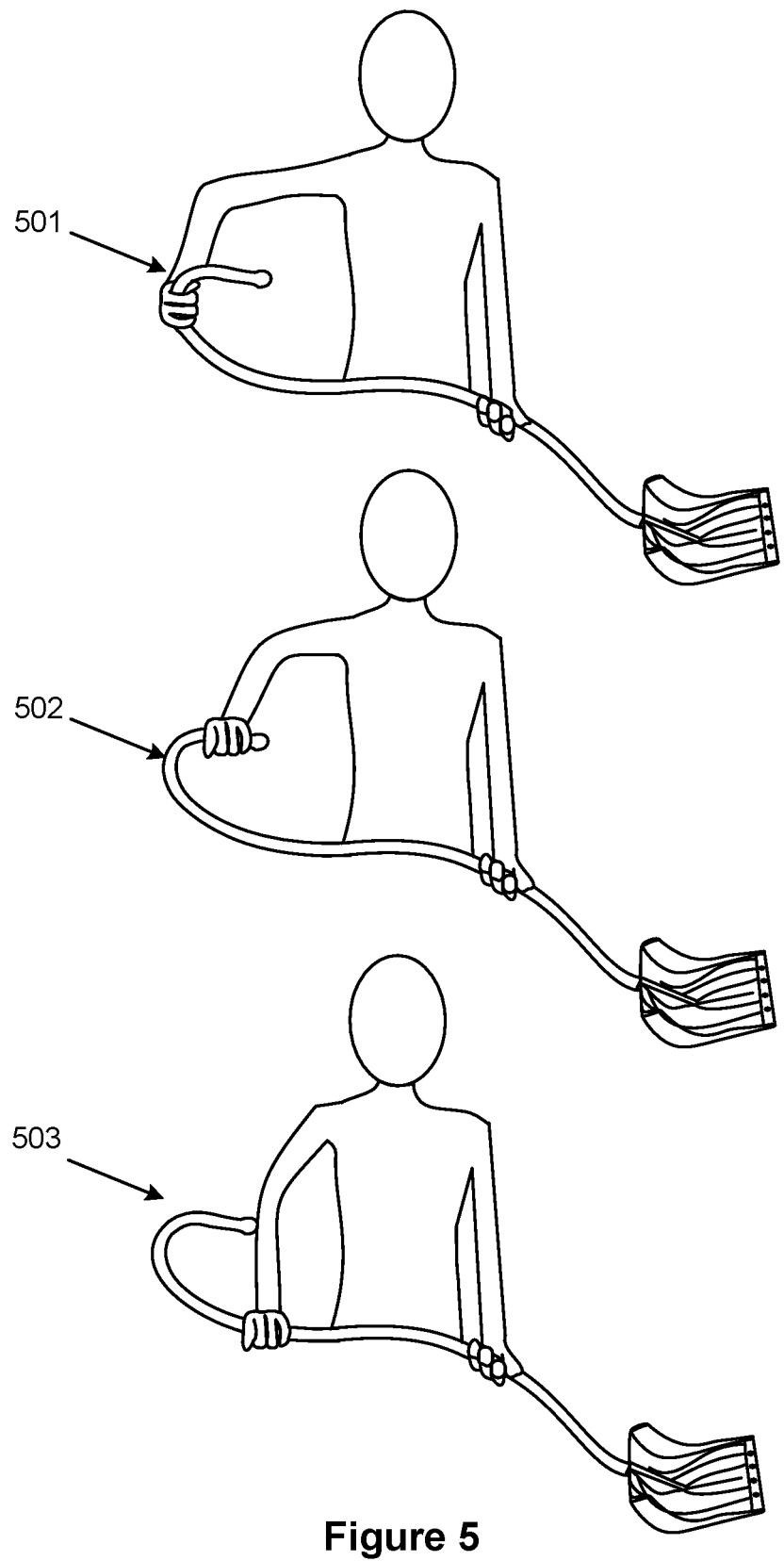
FIG. 5 shows multiple grip options using a leverage-assisted tool according to the embodiments described herein.

The leverage-assisted tool 100 permits the user that is using the tool 100 to manipulated the tool head 103 is various ways. As shown in FIG. 5, the user can rotate the tool head and the user has other grip options to grip the handle in different locations. Furthermore, the tool provides a raised level to aid the user in pressing down to lift a load in the tool head so that the user does not have to bend in order to press down far enough to lift the load. Furthermore, the user may make a shoveling motion with the tool head 103 with a rear hand on a lower portion (lower rung) of the curved portion and then move the rear hand upwards to an upper portion of the curved portion in order to press down and lift the load in the tool head 103.

Figure 3A:
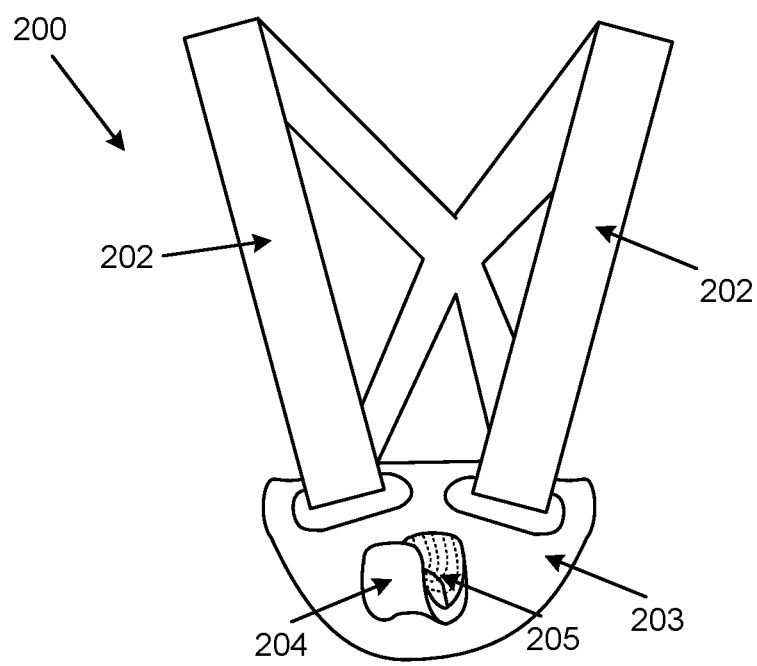
FIG. 3a shows an embodiment of the attachment mechanism that may be a body-mounted fulcrum harness according to the embodiments described herein.

FIG. 3a shows an embodiment of the attachment mechanism 200 that may be a body mounted fulcrum harness that releasably attaches the tool 100 to the body of a user. As shown in FIG. 3a, the attachment mechanism 200 may have a body-mounted fulcrum harness as shown in FIG. 3a and a fulcrum 204. In this embodiment, straps 202 goes over a user's shoulders and crosses at the user's back as shown. However, the leverage assisted tool may also use other designs of the straps including straps that do not cross at the user's back or a single strap supported on one shoulder of the user or a single strap around the user's waist.

Figure 7:
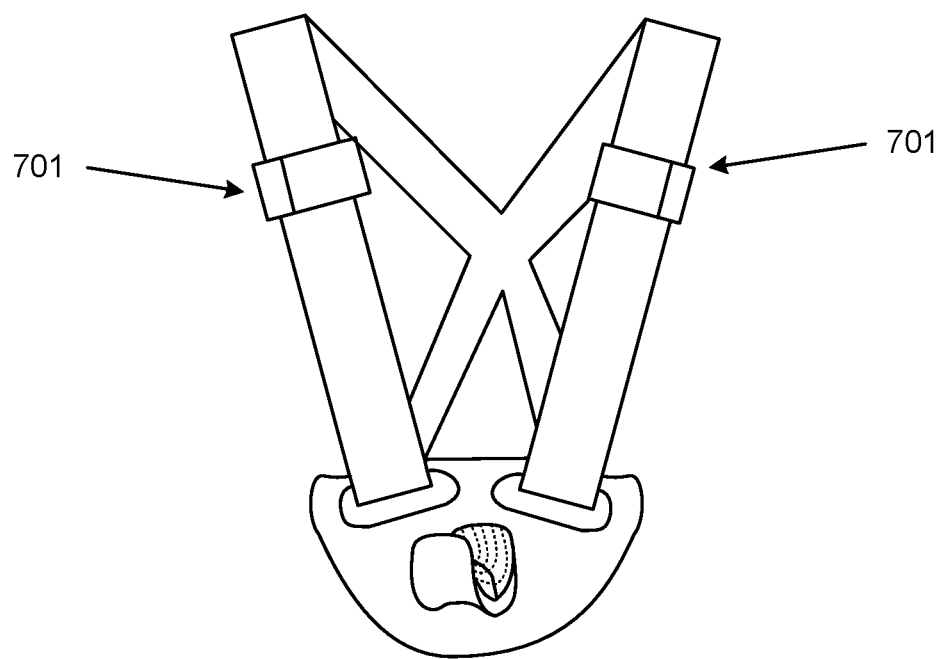
FIG. 7 shows a body-mounted fulcrum harness with adjustable straps according to the embodiments described herein.

FIG. 7 is an alternative embodiment front view of a body-mounted fulcrum harness fitted with buckles 701 or other suitable devices that allow the straps to be adjusted to fit different size users. The straps are secured to a comfort plate 203 that rests, when the straps are appropriately adjusted, at or near the front of the user's body as shown in FIG. 1. For example, the comfort plate 203 may rest near the abdominal region of the user, but may also rest adjacent the very low abdomen/pubic bone, even somewhat below those points. The comfort plate 203 can be polygonal or circular or various other shapes. The side of the comfort plate against the body of the user may be composed of nylon or any number of materials that minimize friction against the user's body and the back of the comfort plate 203 may have cushion/padding/foam material. The comfort plate 203 may have a fulcrum 204 that is securely attached to the comfort plate 203. When assembled, the harness and the fulcrum 204 support the weight of a tool 100 placed into the fulcrum (as shown in FIG. 1) on the shoulders or the waist of the user and allow the user to more effectively use the tool as described below.

As shown in FIG. 3a, the fulcrum 204 is mounted to the exterior side of the comfort plate 203. The preferred embodiment of the fulcrum 204 has an exterior shaped similar to a saddle and an interior channel 205 shaped like a hyperbolic paraboloid having a depth slightly deeper and a width slightly larger than the exterior of the body and the shaft of the tool 100 so that the body portion of the tool may releasably rest in the channel 205 when the tool is being used by the user. In other embodiments, the exterior of the fulcrum 204 maybe polygonal or circular or various other shapes.

Figure 3B:
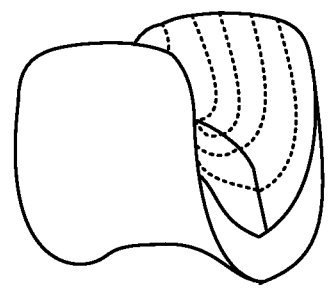
FIG. 3b shows a detailed view of an embodiment of the fulcrum according to the embodiments described herein.

As shown in FIG. 3b, the shape of the interior channel 205, from the user's point of view, is a hyperbolic paraboloid that is convex from left to right, meaning that it is low on left and right, high in the middle, in order to facilitate vertical pivoting/lifting of the tool. In addition, the shape is concave front to back, meaning that it is high in front and back, low in the middle, in order to hold the handle/shaft in place. In some embodiments, the fulcrum 204 may include a strap, collar, or clamp apparatus to secure the shaft of the tool in the channel 205. In other embodiments, the fulcrum 204 may have an open top portion so that the user can easily remove the tool 100 from the fulcrum and the harness, such as when the user falls down or to use the tool without the harness, and/or to seamlessly and conveniently transition between using the tool with or without aid of the harness.

In operation, as shown in FIG. 1, the user places the body portion 101 of the tool 100 in the channel 205 in the fulcrum 204 and holds the tool with one hand on the end portion 104 and one hand on the body portion 101 between the fulcrum 204 and the tool head 103. To lower the tool head 103, the user remains upright and lifts the end portion 104 while holding the other arm in the same position. To lift a load in the tool head 103, the user remains upright and presses down on the end portion 104 while holding the other hand in the same position. The tool shaft rotates or moves in the channel 205, which provides leverage to amplify the effort exerted by the user to provide a greater output force. While resting on the fulcrum, the tool can be rotated, tilted up or down, slid axially forward and backwards or pivoted on a horizontal plane to move from lifting area to unloading area without twisting of spine. In operation, the user may load material onto the tool (axially slide the tool), lever the tool (vertically pivot and tilt the tool), pivot the tool (such as horizontal pivot) and/or unload the material (by rotating the tool.). The movement of the leverage-assisted tool 100 in the channel region 205 minimizes excessive movements of the user that cause strain and injury to the body. It should be noted that the user may use the tool 100 with either hand in a forward position gripping the shaft or holding onto the forward handle portion. One handed operation of the tool 100 may also be possible.

As shown in FIG. 5, the tool 100 can be used with any number of grip positions to accommodate users' comfort preferences. For example, users can operate the tool using a single handed grip on handle, a two-handed vertical grip 501 with the right hand positioned on an end of the end portion 104 and the left hand positioned on a portion of the shaft, or a higher grip 502 with the right hand positioned on a top portion of the end portion 104 and the left hand position on the portion of the shaft, or a lower two-handed horizontal grip 503 with the right hand position on middle portion 104 and the left hand position on the portion of the shaft. The user may also alter the mechanical advantage of the fulcrum by varying the distance between the user's hands on the handle lengths as desired. Furthermore, as described above, the tool 100 may have a front handle portion on a portion of the shaft adjacent the tool head 130 and the user may place one hand around/in the front handle portion instead of around the shaft as shown in FIG. 5.

Figure 4:
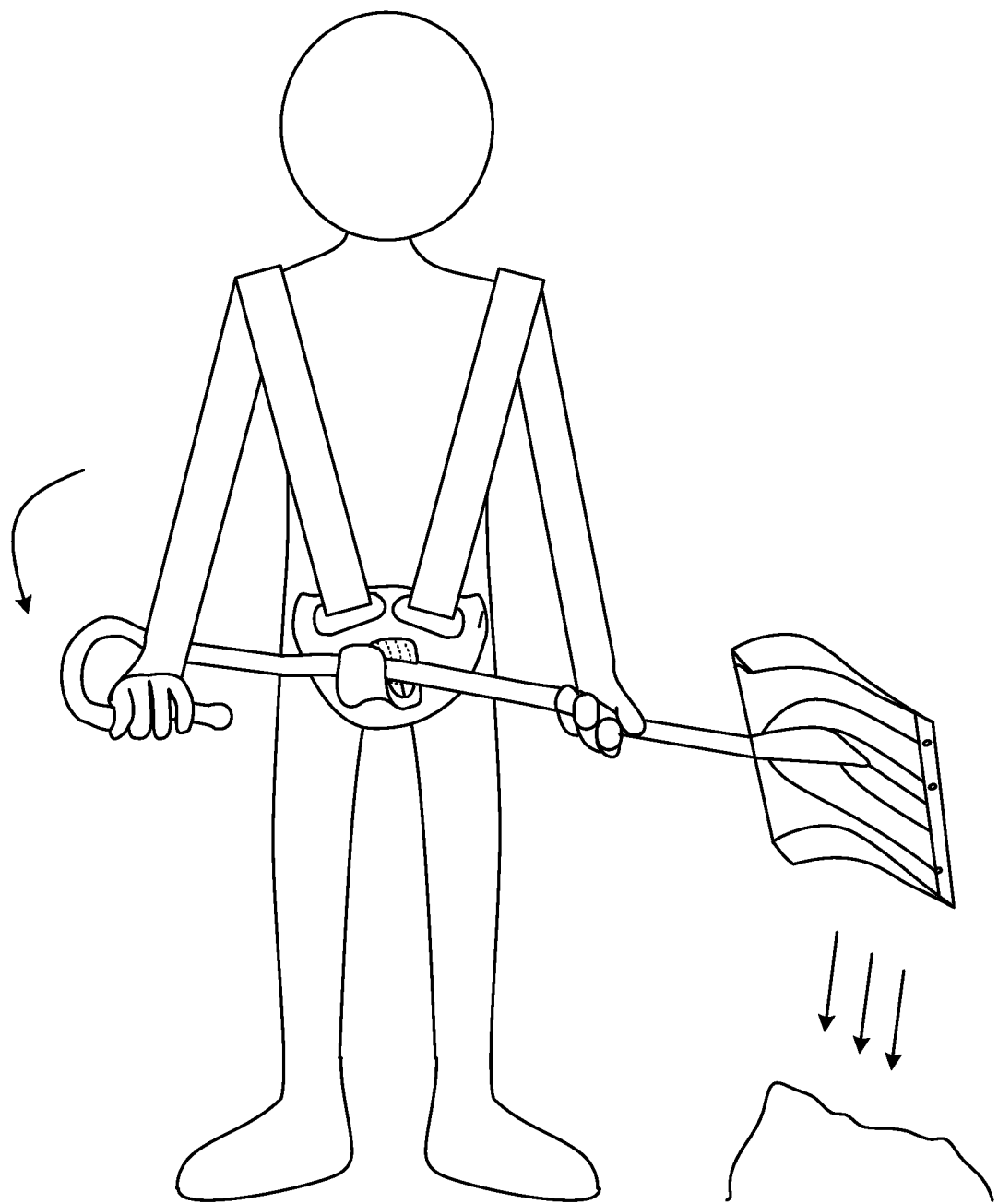
FIG. 4 shows a leverage-assisted tool rested on a body-mounted fulcrum harness in a rotating motion according to the embodiments described herein.

FIG. 4 shows how a user may unload the weighted load from the tool 100 without twisting or otherwise straining the body of the user. When the user has a full load in the tool head 103, the user may rotate a top portion of the end portion 104 downwards as shown in FIG. 4 that rotates the body portion 101 and the tool head 103 thus dumping the contents on the tool head 103 without undue strain of the user.

Figure 6:
FIG. 6 shows a leverage-assisted tool used as a plow type tool according to the embodiments described herein.

FIG. 6 shows an example embodiment where the "U" shaped elongated handle allows the user to use their body weight as a plow-type usage/pushing option. In this embodiment, the tool 100 is not coupled by the attachment mechanism 200 to the body of the user. Also note that the positions of each hand of the user may be different when the user is using the tool for a plow-type or pushing operation. In this example embodiment, the tool (plow in this example) may be directly against the body.

Although the examples in FIGS. 1-6 are of a tool head 103 that is a shovel, the tool 100 may have other tool heads 103, such as a trimmer tool head. The other tool heads 103 still receive the benefit of the device since the harness and fulcrum and the body portion still allow the user to perform various activities without undue strain on the user.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. etc.

The invention claimed is:

1. A tool comprising:
   a tool head;
   an elongated handle attached to the tool head, the handle having a distal end connected to the tool head and a proximal end having a curved portion forming a shape that allows the tool head to be manipulated by a user;
   a harness configured to be attached to a user; and
   an attachment mechanism coupled to the harness, the attachment mechanism having a channel region comprising a hyperbolic paraboloid saddle shape that is configured to receive the elongated handle of the tool so that the tool head is easily manipulated.

2. The tool of claim 1, wherein the elongated handle has a gripping point that is offset from an axis of rotation of the elongated handle.

3. The tool of claim 1, wherein the tool head is one of a shovel and a trimmer.

4. The tool of claim 1, wherein the elongated handle has a forward handle attached to the elongated handle.

5. A tool comprising:
   a harness configured to be attached to a user;
   an attachment mechanism coupled to the harness located at front and center of the harness, the attachment mechanism having a channel region comprising a hyperbolic paraboloid saddle shape; and
   the channel region is configured to receive a middle point of an elongated handle of a tool head that extends between a distal end connected to the tool head and a proximal end having a handle so that the handle of the tool head is easily manipulated.

6. The tool of claim 5, wherein the attachment mechanism allows the handle to be one of removed from the channel region, slid axially forward and backward in the channel region, rotated in the channel region, vertically pivoted or tilted in the channel region, and horizontally pivoted in the channel region.

7. The tool of claim 5, wherein the harness further comprises first and second shoulder straps that go over each shoulder of the user.

8. The tool of claim 7, wherein the first and second shoulder straps cross.

9. The tool of claim 7, wherein the harness further comprises a belt to which the first and second shoulder straps attach.

10. The tool of claim 7, wherein the harness further comprises a belt without shoulder straps.

11. A tool comprising:
    a tool head;
    an elongated handle attached to the tool head, the handle having a distal end connected to the tool head and a proximal end having a curved portion forming an elongated U-shape used to manipulate the tool head, wherein the elongated handle has a first portion curved upwards from the distal end to an inflection point and a second portion curved downwards from the inflection point to the proximal end;
    a harness configured to be attached to a user; and
    an attachment mechanism coupled to the harness, the attachment mechanism having a channel region comprising a hyperbolic paraboloid saddle shape that is configured to receive the elongated handle of the tool so that the tool head is easily manipulated.

12. The tool of claim 11, wherein the attachment mechanism allows the handle to be one of removed from the channel region, slid axially forward and backward in the channel region, rotated in the channel region, vertically pivoted or tilted in the channel region, and horizontally pivoted in the channel region.

13. The tool of claim 11, wherein the elongated handle has a gripping point offset from an axis of rotation created by the harness.

14. The tool of claim 5, wherein the convex hyperbolic paraboloid shape of the channel region supports the elongated handle.

15. The tool of claim 1, wherein the curved portion forming a shape has a free end that extends towards the tool head.

16. The tool of claim 11, wherein the elongated U-shape has a free end that extends towards the tool head.

17. The tool of claim 11, wherein the first portion measures 14 inches and the second portion measures 28 inches.

18. The tool of claim 11, wherein a grip of each hand of the user is adjustable along the length of the elongated handle and a front hand of the user is positionable along the first portion of the elongated handle that is curved upward and a back hand of the user is positionable on one of the elongated U-shape and the second portion of the elongated handle that is curved upward to adjust the mechanical advantage of the tool.

* * * * *